(12) United States Patent
Truettner et al.

(10) Patent No.: US 12,512,702 B2
(45) Date of Patent: Dec. 30, 2025

(54) WIRELESS CHARGING PAD FOR POWER TOOL BATTERY PACKS

(71) Applicant: MILWAUKEE ELECTRIC TOOL CORPORATION, Brookfield, WI (US)

(72) Inventors: Donald J. Truettner, Waukesha, WI (US); Kyle C. Fassbender, Brookfield, WI (US); Ryan B. Jipp, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 934 days.

(21) Appl. No.: 17/481,645

(22) Filed: Sep. 22, 2021

(65) Prior Publication Data

US 2022/0094207 A1    Mar. 24, 2022

Related U.S. Application Data

(60) Provisional application No. 63/081,447, filed on Sep. 22, 2020.

(51) Int. Cl.
*H02J 50/40* (2016.01)
*H02J 50/10* (2016.01)
*H02J 50/80* (2016.01)

(52) U.S. Cl.
CPC ............ *H02J 50/402* (2020.01); *H02J 50/10* (2016.02); *H02J 50/80* (2016.02)

(58) Field of Classification Search
CPC ................................................... H02J 50/402
See application file for complete search history.

(56) References Cited

U.S. PATENT DOCUMENTS 6,805,998 B2   10/2004   Jenson et al.
6,924,164 B2   8/2005   Jenson
(Continued)

FOREIGN PATENT DOCUMENTS

CN    202758989 U    2/2013
CN    208939615 U    6/2019
(Continued)

OTHER PUBLICATIONS

Stihl, "Robotic Mowers by Stihl," <https://www.stihlusa.com/products/imow/> web page visited Sep. 29, 2021.
(Continued)

*Primary Examiner* — Tynese V Mcdaniel
(74) *Attorney, Agent, or Firm* — Michael Best & Friedrich LLP

(57) ABSTRACT

Systems and methods for wireless charging of a battery pack. One system includes a plurality of battery packs and a wireless charger. Each of the plurality of battery packs includes a receiving antenna configured to convert an alternating current power to a charging current. The wireless charger includes an alternating current to direct current converter, a transmitter antenna configured to convert direct current power received from the alternating current to direct current converter to the alternating current power and transmit the alternating current power to each of the plurality of battery packs. The wireless charger also includes a communication circuit configured to transmit communication signals to an external device.

18 Claims, 9 Drawing Sheets

(56) References Cited

U.S. PATENT DOCUMENTS

| | | | |
|---|---|---|---|
| 6,962,613 B2 | 11/2005 | Jenson | |
| 6,986,965 B2 | 1/2006 | Jenson et al. | |
| 7,131,189 B2 | 11/2006 | Jenson | |
| 7,144,655 B2 | 12/2006 | Jenson et al. | |
| 7,157,187 B2 | 1/2007 | Jenson | |
| 7,194,801 B2 | 3/2007 | Jenson et al. | |
| 7,389,580 B2 | 6/2008 | Jenson et al. | |
| 7,433,655 B2 | 10/2008 | Jacobs et al. | |
| D623,601 S | 9/2010 | Harrison et al. | |
| 7,821,410 B2 | 10/2010 | Higashionji et al. | |
| D627,204 S | 11/2010 | Harrison et al. | |
| D627,246 S | 11/2010 | Harrison et al. | |
| 7,872,444 B2 | 1/2011 | Hamilton et al. | |
| 7,877,120 B2 | 1/2011 | Jacobs et al. | |
| 7,948,208 B2 | 5/2011 | Partovi et al. | |
| 7,952,322 B2 | 5/2011 | Partovi et al. | |
| 7,982,623 B2 | 7/2011 | Higashionji et al. | |
| 8,044,508 B2 | 10/2011 | Jenson et al. | |
| 8,169,185 B2 | 5/2012 | Partovi et al. | |
| 8,219,140 B2 | 7/2012 | Jacobs et al. | |
| 8,373,371 B2 | 2/2013 | Clothier et al. | |
| 8,614,557 B2 | 12/2013 | Clothier et al. | |
| 8,629,652 B2 | 1/2014 | Partovi et al. | |
| 8,629,654 B2 | 1/2014 | Partovi et al. | |
| 8,637,349 B2 | 1/2014 | Jenson et al. | |
| 8,761,842 B2 | 6/2014 | Jacobs et al. | |
| 8,907,623 B2 | 12/2014 | Saur | |
| 8,947,047 B2 | 2/2015 | Partovi et al. | |
| 9,035,601 B2 | 5/2015 | Kim et al. | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,136,729 B2 | 9/2015 | Ashinghurst et al. | |
| 9,178,369 B2 | 11/2015 | Partovi | |
| 9,178,377 B2 | 11/2015 | Rejman et al. | |
| 9,190,851 B2 | 11/2015 | Kim et al. | |
| 9,257,865 B2 | 2/2016 | Huggins et al. | |
| 9,276,437 B2 | 3/2016 | Partovi et al. | |
| 9,356,659 B2 | 5/2016 | Partovi | |
| 9,362,778 B2 | 6/2016 | Lee et al. | |
| 9,461,501 B2 | 10/2016 | Partovi et al. | |
| 9,496,732 B2 | 11/2016 | Partovi | |
| 9,502,922 B2 | 11/2016 | Hasegawa et al. | |
| 9,520,738 B2 | 12/2016 | Rejman et al. | |
| 9,537,335 B2 | 1/2017 | Furui et al. | |
| 9,553,459 B2 | 1/2017 | Mack | |
| 9,577,440 B2 | 2/2017 | Partovi et al. | |
| 9,577,450 B2 | 2/2017 | Yoshikawa et al. | |
| 9,595,701 B2 | 3/2017 | Matthias et al. | |
| 9,595,839 B2 | 3/2017 | Furui et al. | |
| 9,601,943 B2 | 3/2017 | Partovi et al. | |
| 9,721,723 B2 | 8/2017 | Lohr et al. | |
| 9,722,447 B2 | 8/2017 | Partovi | |
| 9,780,583 B2 | 10/2017 | Furui et al. | |
| 9,793,721 B2 | 10/2017 | Partovi et al. | |
| 9,793,730 B2 | 10/2017 | Suda et al. | |
| 9,837,839 B2 | 12/2017 | Orr et al. | |
| 9,866,036 B2 | 1/2018 | Asaoka et al. | |
| 9,887,576 B2 | 2/2018 | Zhang et al. | |
| 9,893,555 B1 | 2/2018 | Leabman et al. | |
| 9,912,188 B2 | 3/2018 | Lohr | |
| 9,923,402 B2 | 3/2018 | Breitenbach et al. | |
| 9,935,483 B2 | 4/2018 | Krupezevic et al. | |
| 9,948,128 B2 | 4/2018 | Ashinghurst et al. | |
| 9,984,816 B2 | 5/2018 | Lohr et al. | |
| 10,044,229 B2 | 8/2018 | Partovi et al. | |
| 10,063,096 B2 | 8/2018 | Rejman et al. | |
| 10,065,513 B2 | 9/2018 | Plum et al. | |
| 10,069,328 B2 | 9/2018 | Meng et al. | |
| 10,090,692 B2 | 10/2018 | Yoshikawa et al. | |
| 10,115,520 B2 | 10/2018 | Partovi | |
| 10,124,455 B2 | 11/2018 | Ito et al. | |
| 10,126,368 B2 | 11/2018 | Rejman et al. | |
| 10,141,770 B2 | 11/2018 | Partovi | |
| 10,170,238 B2 | 1/2019 | Rejman et al. | |
| 10,199,856 B2 | 2/2019 | Ashinghurst et al. | |
| 10,277,055 B2 | 4/2019 | Peterson et al. | |
| 10,279,692 B2 | 5/2019 | Asaoka et al. | |
| 10,283,817 B2 | 5/2019 | Barnett et al. | |
| 10,293,476 B2 | 5/2019 | Fleischmann | |
| 10,367,369 B2 | 7/2019 | Partovi | |
| 10,396,573 B2 | 8/2019 | Furui et al. | |
| 10,476,284 B2 | 11/2019 | Suzuki et al. | |
| 10,483,806 B2 | 11/2019 | Meng et al. | |
| 10,511,183 B2 | 12/2019 | Pan et al. | |
| 10,516,286 B2 | 12/2019 | Mack | |
| 10,547,211 B2 | 1/2020 | Meng et al. | |
| 2001/0032666 A1 | 10/2001 | Jenson et al. | |
| 2004/0185310 A1 | 9/2004 | Jenson et al. | |
| 2005/0045223 A1 | 3/2005 | Jenson et al. | |
| 2006/0021214 A1 | 2/2006 | Jenson et al. | |
| 2008/0061734 A1 | 3/2008 | Roehm et al. | |
| 2009/0212736 A1* | 8/2009 | Baarman | H02J 50/12 320/106 |
| 2010/0181964 A1* | 7/2010 | Huggins | H02J 50/40 320/108 |
| 2010/0190052 A1 | 7/2010 | Rajani et al. | |
| 2011/0029157 A1 | 2/2011 | Muzaffer | |
| 2011/0050164 A1 | 3/2011 | Partovi et al. | |
| 2011/0057606 A1 | 3/2011 | Saunamäki | |
| 2012/0229083 A1 | 9/2012 | Matthias et al. | |
| 2013/0020988 A1 | 1/2013 | Kim et al. | |
| 2013/0093388 A1 | 4/2013 | Partovi | |
| 2013/0241309 A1* | 9/2013 | Arnold | H02J 50/50 307/104 |
| 2013/0260677 A1 | 10/2013 | Partovi | |
| 2013/0271069 A1 | 10/2013 | Partovi | |
| 2013/0278208 A1 | 10/2013 | Rejman et al. | |
| 2013/0285605 A1 | 10/2013 | Partovi | |
| 2013/0307472 A1 | 11/2013 | Rejman et al. | |
| 2014/0132206 A1* | 5/2014 | Zhu | H02J 50/10 320/108 |
| 2014/0151079 A1* | 6/2014 | Furui | H02J 7/0042 173/171 |
| 2014/0167676 A1 | 6/2014 | Mack | |
| 2014/0176065 A1 | 6/2014 | Rejman et al. | |
| 2014/0232332 A1 | 8/2014 | Feuerstack | |
| 2014/0340034 A1 | 11/2014 | Dietzel et al. | |
| 2014/0353191 A1 | 12/2014 | Decicco et al. | |
| 2014/0375251 A1* | 12/2014 | Sakai | H02M 7/537 307/149 |
| 2015/0002089 A1 | 1/2015 | Rejman et al. | |
| 2015/0022146 A1 | 1/2015 | Huber | |
| 2015/0318732 A1 | 11/2015 | Heine et al. | |
| 2015/0318733 A1 | 11/2015 | Stock et al. | |
| 2015/0333559 A1 | 11/2015 | Lohr et al. | |
| 2015/0340153 A1 | 11/2015 | Lohr et al. | |
| 2016/0094080 A1 | 3/2016 | Dong | |
| 2016/0099575 A1 | 4/2016 | Velderman et al. | |
| 2016/0099606 A1 | 4/2016 | Zhang et al. | |
| 2016/0135269 A1 | 5/2016 | Hornick et al. | |
| 2017/0025896 A1 | 1/2017 | Partovi et al. | |
| 2017/0040834 A1 | 2/2017 | Hasegawa et al. | |
| 2017/0085136 A1 | 3/2017 | Pfeiffer et al. | |
| 2018/0040927 A1 | 2/2018 | Rejman et al. | |
| 2018/0041047 A1 | 2/2018 | Partovi et al. | |
| 2018/0090959 A1 | 3/2018 | Orr et al. | |
| 2018/0097400 A1* | 4/2018 | Vladan | H02J 50/12 |
| 2018/0102666 A1 | 4/2018 | Margaritis et al. | |
| 2018/0109148 A1 | 4/2018 | Meng et al. | |
| 2018/0126534 A1 | 5/2018 | Iida et al. | |
| 2018/0175653 A1 | 6/2018 | Tschopp et al. | |
| 2018/0219428 A1* | 8/2018 | Bae | H02J 50/60 |
| 2018/0241240 A1* | 8/2018 | Ashinghurst | H02J 7/0042 |
| 2018/0372806 A1* | 12/2018 | Laughery | H02J 7/00 |
| 2019/0027720 A1 | 1/2019 | Rejman et al. | |
| 2019/0097447 A1 | 3/2019 | Partovi | |
| 2019/0097448 A1 | 3/2019 | Partovi | |
| 2019/0148983 A1* | 5/2019 | Kozakai | H02J 50/12 320/108 |
| 2019/0235041 A1* | 8/2019 | Lee | H02J 7/02 |
| 2019/0296799 A1 | 9/2019 | Park | |
| 2019/0334357 A1 | 10/2019 | Furui et al. | |

(56) References Cited

U.S. PATENT DOCUMENTS

| | | | |
|---|---|---|---|
| 2019/0363584 A1* | 11/2019 | Leem .................... | H01Q 13/00 |
| 2019/0372403 A1* | 12/2019 | Park ....................... | H04B 5/79 |
| 2020/0036214 A1 | 1/2020 | Partovi | |
| 2020/0044694 A1 | 2/2020 | Park | |
| 2020/0076233 A1* | 3/2020 | Bae ....................... | G06F 1/3259 |
| 2020/0083747 A1 | 3/2020 | Huang et al. | |
| 2020/0153284 A1* | 5/2020 | Shi ........................ | H02J 7/02 |
| 2021/0020348 A1 | 1/2021 | Luzinski et al. | |
| 2021/0281120 A1* | 9/2021 | Bhandarkar .......... | H04B 5/79 |
| 2022/0085651 A1* | 3/2022 | Sherman ................ | H02J 7/02 |
| 2022/0102995 A1* | 3/2022 | Fieldbinder .......... | H02J 50/12 |
| 2022/0259008 A1* | 8/2022 | Nakagawa ............. | B66B 7/00 |
| 2023/0387708 A1* | 11/2023 | Prosser ................. | F04B 39/066 |
| 2023/0402879 A1* | 12/2023 | Park ...................... | H02J 50/60 |

FOREIGN PATENT DOCUMENTS

| | | |
|---|---|---|
| CN | 210867238 U | 6/2020 |
| EP | 1723681 B1 | 10/2016 |
| EP | 3178304 B1 | 11/2019 |
| KR | 1020160017626 A | 2/2016 |
| WO | 2013014878 A1 | 1/2013 |
| WO | 2013146017 A1 | 10/2013 |
| WO | 2014141537 A1 | 9/2014 |
| WO | 2018233983 A1 | 12/2018 |
| WO | 2019149473 A1 | 8/2019 |

OTHER PUBLICATIONS

International Search Report and Written Opinion for Application No. PCT/US2021/051466 dated Jan. 7, 2022 (12 pages).

* cited by examiner

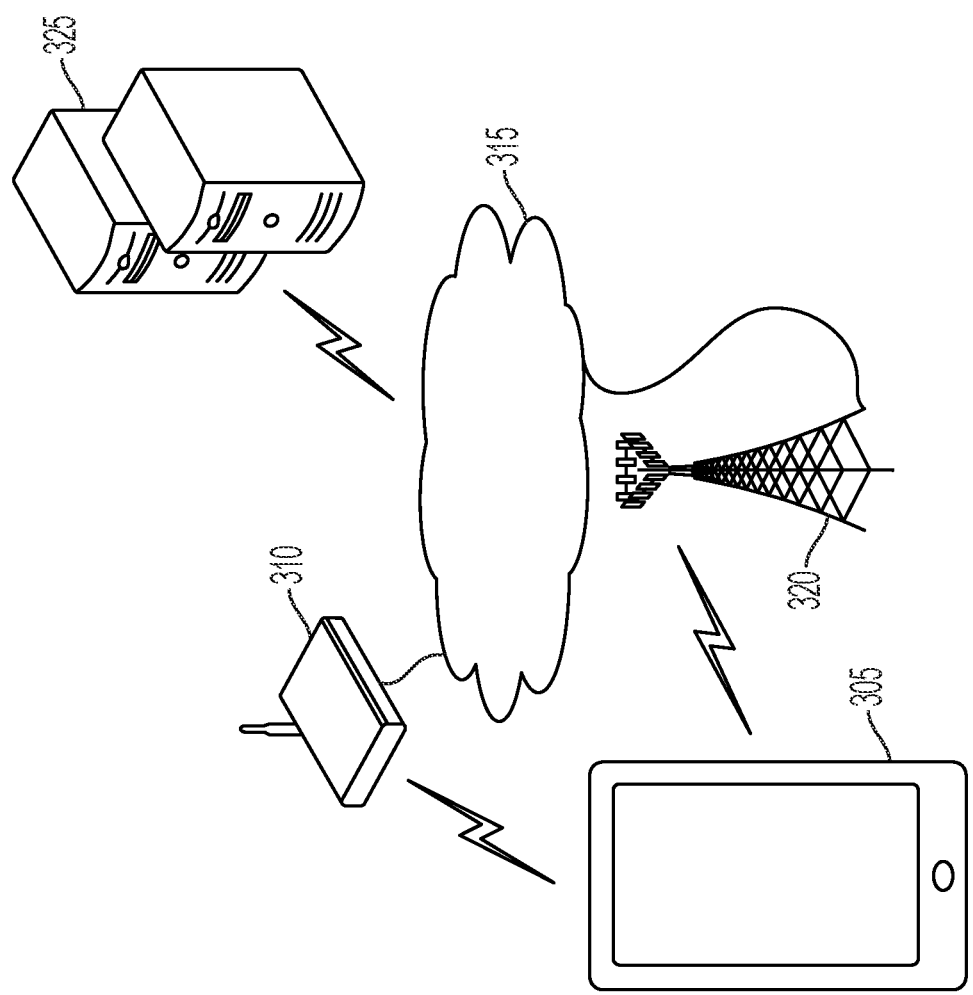
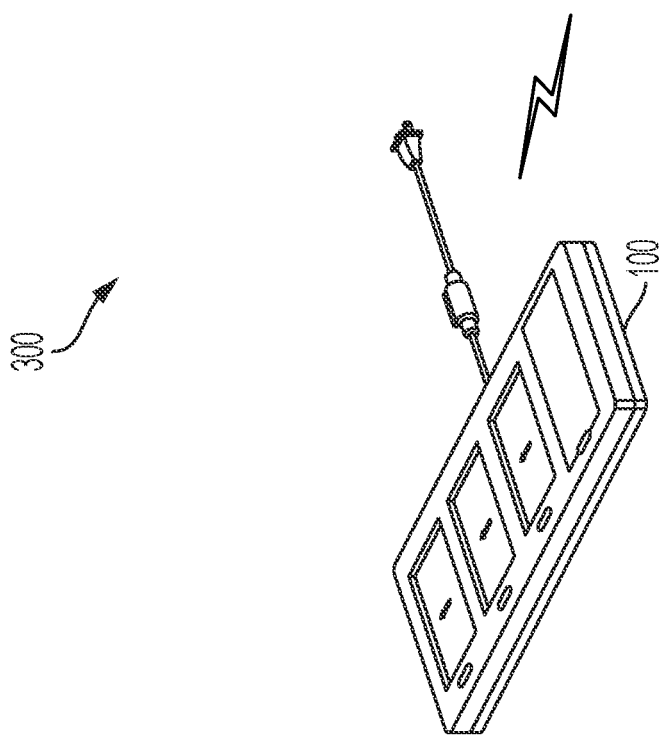
FIG. 3

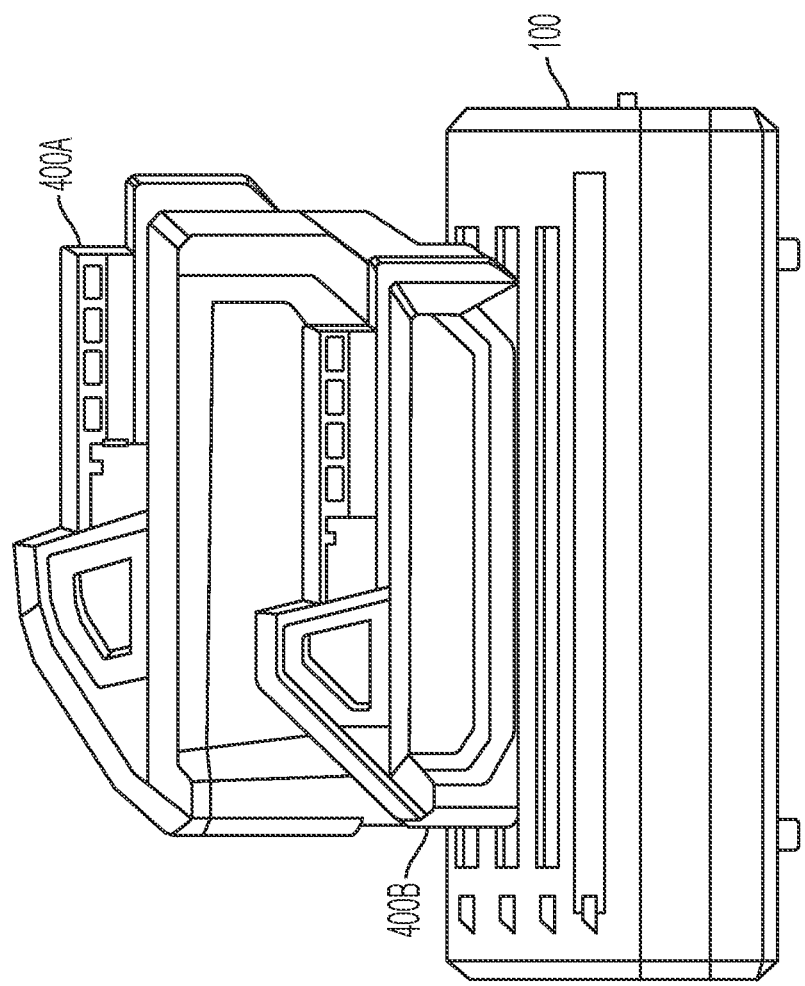

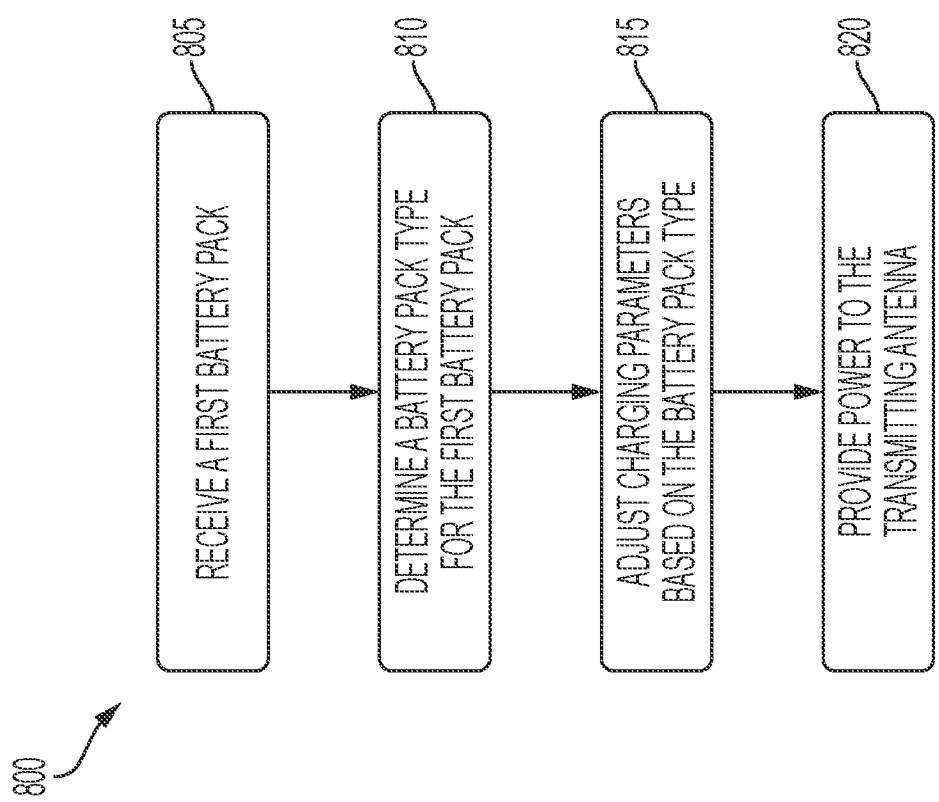

WIRELESS CHARGING PAD FOR POWER TOOL BATTERY PACKS

RELATED APPLICATIONS

This application claims the benefit of U.S. Provisional Patent Application No. 63/081,447, filed Sep. 22, 2020, the entire content of which is hereby incorporated by reference.

FIELD

Embodiments described herein provide systems and methods for wirelessly charging a plurality of power tool battery packs.

SUMMARY

Embodiments described herein provide systems and methods for wirelessly charging a plurality of power tool battery packs.

Charging systems described herein include a plurality of battery packs and a wireless charger. Each of the plurality of battery packs includes a receiving antenna configured to convert an alternating current power to a charging current. The wireless charger includes an alternating current to direct current converter configured to provide direct current power and a transmitter antenna configured to convert direct current power received from the alternating current to direct current converter to the alternating current power and transmit the alternating current power to each of the plurality of battery packs. The wireless charger also includes a communication circuit configured to transmit communication signals to an external device.

Another charging system described herein includes a battery pack and a wireless charger. The battery pack includes a receiving antenna configured to convert an alternating current field to a charging current. The receiving antenna has a complex impedance. The wireless charger includes an alternating current to direct current converter, a transmitter antenna, and a charger controller. The alternating current to direct current converter is configured to provide direct current power. The transmitter antenna is configured to convert direct current power received from the alternating current to direct current converter to the alternating current field. The charger controller is configured to determine the complex impedance of the receiving antenna, determine charging parameters based on the complex impedance, and provide power to the transmitting antenna to charge the battery pack based on the charging parameters.

Methods described herein provide for wirelessly charging a battery pack for a power tool. The methods include receiving, with a wireless charger, a battery pack, determining, with a controller, a battery pack type for the battery pack based on an impedance of the battery pack, modifying, with the controller, a charging parameter based on the battery pack type, and providing, with the controller, power to a transmitting antenna of the wireless charger to charge the first battery pack based on the charging parameter.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiments, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other features and aspects will become apparent by consideration of the following detailed description and accompanying drawings.

BRIEF DESCRIPTION OF THE DRAWINGS

FIG. 3 illustrates a communication system implementing the wireless charger of FIG. 1, in accordance with embodiments described herein.

FIG. 8 illustrates a side view of a plurality of battery packs of FIG. 3 associated with the wireless charger of FIG. 1, in accordance with embodiments described herein.

FIG. 10 illustrates a block diagram of a method performed by the controller of FIG. 2, in accordance with embodiments described herein.

DETAILED DESCRIPTION

Figure 1:
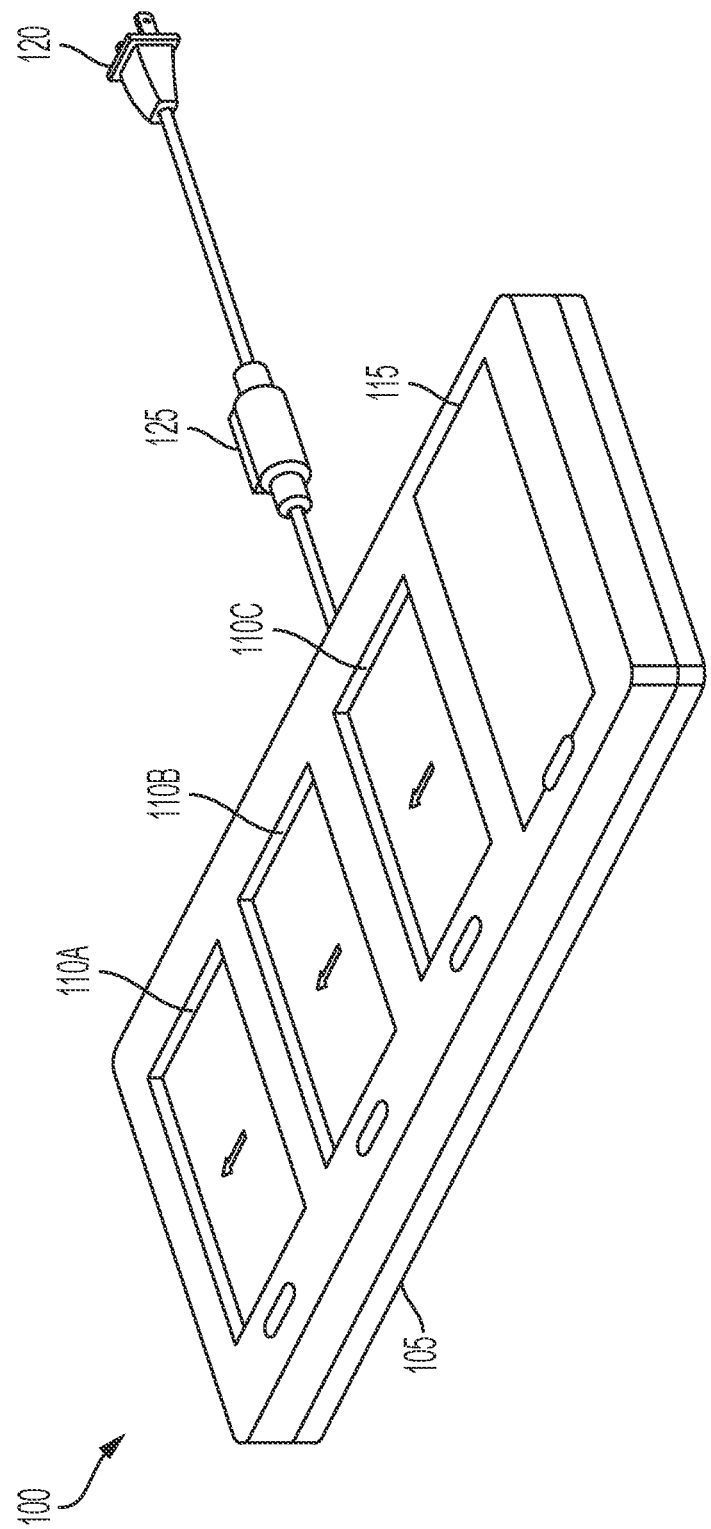
FIG. 1 illustrates a perspective view of a wireless charger, in accordance with embodiments described herein.

FIG. 1 illustrates an example wireless charger 100 (e.g., a charging pad) according to some embodiments. The wireless charger 100 includes a charger housing 105, a plurality of charging stations 110a-110c, a secondary charging station 115, and an alternating current (AC) plug 120. The plurality of charging stations 110a-110c are configured to receive a battery pack, such as a power tool battery pack, as described in more detail below. In some embodiments, the wireless charger 100 includes one or more contours. For example, the wireless charger 100 illustrated in FIG. 1 includes three contours. The secondary charging station 115 may be configured to charge Qi-compatible devices, such as mobile phones, tablets, and the like. The AC plug 120 is configured to receive AC power from an AC power source 265 (shown in FIG. 2). The AC power source 265 may be, for example, a single AC line voltage or a universal AC line voltage. The wireless charger 100 may also be configured to receive DC voltage for the source of power, such as a solar panel, a wind turbine, a battery pack, or the like. In some embodiments, the wireless charger 100 further includes a ferrite bead 125 configured to filter noise from the AC power source 265. In some embodiments, the wireless charger 100 is integrated into a toolbox, rolling workbox storage unit, or the like. For example, the wireless charger 100 may be integrated within a toolbox such that tool battery packs are wirelessly charged when placed within the toolbox.

Figure 2:
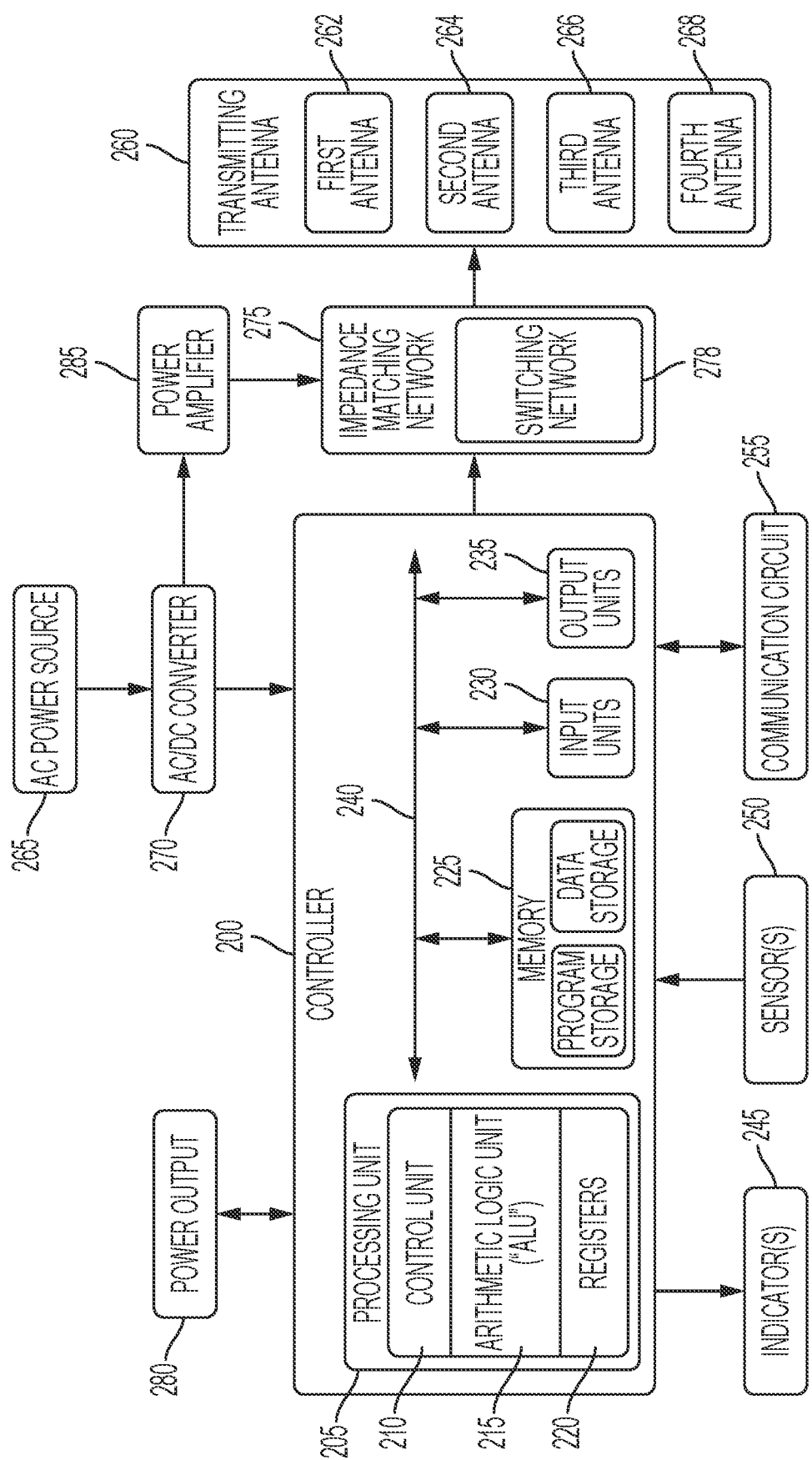
FIG. 2 illustrates a block diagram of a controller for the wireless charger of FIG. 1, in accordance with embodiments described herein.

A charger controller 200 for the wireless charger 100 is illustrated in FIG. 2. The charger controller 200 is electrically and/or communicatively connected to a variety of modules or components of the wireless charger 100. For example, the illustrated charger controller 200 is connected to indicator(s) 245, one or more sensor(s) 250, a first communication circuit 255, a transmitting antenna 260, an AC power source 265, an impedance matching network 275, and a power output 280 (e.g., a 12V DC output, a USB power output, etc.).

The charger controller 200 includes a plurality of electrical and electronic components that provide power, operational control, and protection to the components and modules within the charger controller 200 and/or wireless charger 100. For example, the charger controller 200 includes, among other things, a processing unit 205 (e.g., a microprocessor, an electronic processor, an electronic controller, a microcontroller, or another suitable programmable device), a memory 225, input units 230, and output units 235. The processing unit 205 includes, among other things, a control unit 210, an arithmetic logic unit ("ALU") 215, and a plurality of registers 220 (shown as a group of registers in FIG. 2), and is implemented using a known computer architecture (e.g., a modified Harvard architecture, a von Neumann architecture, etc.). The processing unit 205, the memory 225, the input units 230, and the output units 235, as well as the various modules connected to the charger controller 200 are connected by one or more control and/or data buses (e.g., common bus 240). The control and/or data buses are shown generally in FIG. 2 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instruction that are capable of being stored in a RAM of the memory 225 (e.g., during execution), a ROM of the memory 225 (e.g., on a generally permanent basis), or another non-transitory computer readable medium such as another memory or a disc. Software included in the implementation of the wireless charger 100 can be stored in the memory 225 of the charger controller 200. The software includes, for example, firmware, one or more applications, program data, filters, rules, one or more program modules, and other executable instructions. The charger controller 200 is configured to retrieve from the memory 225 and execute, among other things, instructions related to the control processes and methods described herein. In other embodiments, the charger controller 200 includes additional, fewer, or different components.

Power received from the AC power source 265 is converted into direct current (DC) power by an AC/DC converter 270 (e.g., a direct current power source). Accordingly, the AC/DC converter 270 acts as a DC power source for the charger controller 200. The charger controller 200 drives the transmitting antenna 260 with the DC power through the impedance matching network 275. In some embodiments, the impedance matching network 275 and the AC/DC converter 270 are connected via a power amplifier 285. The impedance matching network 275 can be used to control the impedance associated with the transmitting antenna 260, and control the DC power provided to the transmitting antenna 260. For example, the impedance matching network 275 may include a plurality of electrical components, such as resistors, inductors, and capacitors used to set an impedance. A switching network 278 of the impedance matching network 275 includes a plurality of switches that connect the transmitting antenna 260 to the plurality of electrical components to achieve a specific impedance. The specific impedance may be based on a type of a battery pack, as described further below. Additionally, the transmitting antenna 260 may include a first antenna 262, a second antenna 264, a third antenna 266, and a fourth antenna 268. The first antenna 262 may align with the charging station 110a, the second antenna 264 may align with the charging station 110b, the third antenna 266 may align with the charging station 110c, and the fourth antenna 268 may align with the secondary charging station 115. Each antenna 262, 264, 266, 268 may be independently controllable by the charger controller 200 through the impedance matching network 275 (e.g., to ensure maximum wireless power transfer). For example, the charger controller 200 may associate the first antenna 262 with a first impedance, the second antenna 264 with a second impedance, and the third antenna 266 with a third impedance. In some embodiments, each antenna 262, 264, 266, 268 has their own impedance matching network 275.

The transmitting antenna 260 may be configured for capacitive power transfer, inductive power transfer, etc. When configured for capacitive power transfer, the transmitting antenna 260 may be constructed from a pair of electrostatic plates acting as a capacitor. When provided with power and configured for capacitive power transfer, the transmitting antenna 260 creates or generates an AC electric field transmitted through the air medium surrounding the transmitting antenna 260. When configured for inductive power transfer, the transmitting antenna 260 may be constructed as a conductor wrapped in a coil form (e.g., inductive coil). When provided with power and configured for inductive power transfer, the transmitting antenna 260 creates an AC magnetic field transmitted through the air medium surrounding the transmitting antenna 260. In some embodiments, rather than an inductive coil, the transmitting antenna 260 is a PCB trace antenna. However, the transmitting antenna 260 may be any antenna capable of wireless power transfer.

The one or more sensor(s) 250 transmit signals to the charger controller 200 associated with operational parameters of the wireless charger 100. The one or more sensor(s) 250 may include, for example, a voltage sensor, a current sensor, and a temperature sensor. The voltage sensor may transmit voltage signals to the charger controller 200 indicative of a voltage provided by the AC/DC converter 270, a voltage provided by the transmitting antenna 260, and/or a voltage provided by each of the first antenna 262, the second antenna 264, the third antenna 266, and the fourth antenna 268. The voltage signals may be used by the charger controller 200 to determine overvoltage conditions within the wireless charger 100. The current sensor may transmit current signals to the charger controller 200 indicative of a current provided to the transmitting antenna 260, a current provided to the first antenna 262, a current provided to the second antenna 264, a current provided to the third antenna 266, and/or a current provided to the fourth antenna 268. The temperature sensor may transmit temperature signals to the charger controller 200 indicative of a temperature of the wireless charger 100.

The indicators 245 are also connected to the charger controller 200 and receive control signals from the charger controller 200 to turn on and off or otherwise convey information based on different states of the wireless charger 100. The indicators 245 include, for example, one or more light-emitting diodes (LEDs), or a display screen. The indicators 245 can be configured to display conditions of, or information associated with, battery packs coupled to the wireless charger 100, such as battery pack 400 illustrated in FIG. 4. For example, the indicators 245 can display information relating to the charging state of the battery pack 400, such as the charging or battery pack capacity, input power, output power, charge time, etc. The indicators 245 may also display information relating to a fault condition, or other abnormality, of the wireless charger 100. In addition to or in place of visual indicators, the indicators 245 may also include a speaker or a tactile feedback mechanism to convey information to a user through audible or tactile outputs.

The charger controller 200 may utilize a first communication circuit 255 to communicate with devices external to the wireless charger 100, such as the battery pack 400 or an external device. For example, the battery pack 400 may transmit charging parameters to the charger controller 200, described in more detail below. In some embodiments, the first communication circuit 255 may transmit information associated with the battery pack 400 to a mobile device. FIG. 3 illustrates a communication system 300. The communication system 300 includes the wireless charger 100 and an external device 305. The wireless charger 100 and the external device 305 can communicate wirelessly while they are within a communication range of each other. The wireless charger 100 may transmit information regarding the charging status of each battery pack 400 coupled to the wireless charger 100.

More specifically, the wireless charger 100 can monitor, log, and/or communicate various charging parameters that can be used for confirmation of correct charging performance, detection of a malfunction of the charger, and determination of a need or desire for service. The various charging parameters detected, determined, and/or captured by the charger controller 200 and output to the external device 305 can include input power provided to the wireless charger 100, a charging time (e.g., time it takes the wireless charger 100 to charge a battery pack 400), a number of battery pack(s) 400 received by the wireless charger 100, a type of each battery pack 400 received by the wireless charger 100, a charging capacity of each battery pack 400 received by the wireless charger 100, a charging state of each battery pack 400 received by the wireless charger 100, a total number of charging cycles performed by wireless charger 100, a number of remaining service cycles (i.e., a number of charging cycles before the wireless charger 100 should be serviced, repaired, or replaced), a number of transmissions sent to the external device 305, a number of transmissions received from the external device 305, a number of errors generated in the transmissions sent to the external device 305, a number of errors generated in the transmissions received from the external device 305, a code violation resulting in a master control unit (MCU) reset, a short in the power circuitry (e.g., a metal-oxide-semiconductor field-effect transistor [MOSFET] short), a hot thermal overload condition (i.e., a prolonged electric current exceeding a full-loaded threshold that can lead to excessive heating and deterioration of the winding insulation until an electrical fault occurs), a cold thermal overload (i.e., a cyclic or in-rush electric current exceeding a zero load threshold that can also lead to excessive heating and deterioration of the winding insulation until an electrical fault occurs), a non-maskable interrupt (NMI) hardware MCU Reset (e.g., of the charger controller 200), etc.

Using the external device 305, a user can access the charging parameters obtained by the wireless charger 100. With the charging parameters, a user can determine a charging state or charging capacity of the battery pack(s) 400 (e.g., charge complete), whether maintenance is recommended or has been performed in the past, and identify malfunctioning components or other reasons for certain performance issues. The external device 305 can also transmit data to the wireless charger 100 for charging configuration, firmware updates, or to send charging commands. The external device 305 also allows a user to set operational parameters, safety parameters, select charging parameters of each battery pack 400, and the like for the wireless charger 100.

The external device 305 is, for example, a smart phone (as illustrated), a laptop computer, a tablet computer, a personal digital assistant (PDA), or another electronic device capable of communicating wirelessly with the wireless charger 100 and providing a user interface. The external device 305 provides the user interface and allows a user to access and interact with the wireless charger 100. The external device 305 can receive user inputs to determine operational parameters, enable or disable features, and the like. The user interface of the external device 305 provides an easy-to-use interface for the user to control and customize operation of the wireless charger 100. The external device 305, therefore, grants the user access to the charging operational data of the wireless charger 100, and provides a user interface such that the user can interact with the charger controller 200 of the wireless charger 100. In some embodiments, the wireless charger 100 includes one or more USB inputs (e.g., via the power output 280) such that the external device 305 may be connected to the wireless charger 100 via a wired connection. In some embodiments, the one or more USB inputs also act as charging ports or communication ports.

In addition, as shown in FIG. 3, the external device 305 can also share the charging operational data obtained from the wireless charger 100 with a remote server 325 connected through a network 315. The remote server 325 may be used to store the charging operational data obtained from the external device 305, provide additional functionality and services to the user, or a combination thereof. In some embodiments, storing the information on the remote server 325 allows a user to access the information from a plurality of different locations. In some embodiments, the remote server 325 collects information from various users regarding their charging devices and provide statistics or statistical measures to the user based on information obtained from the different charging devices. For example, the remote server 325 may provide statistics regarding the experienced efficiency of the wireless charger 100, typical usage of the wireless charger 100, and other relevant characteristics and/or measures of the wireless charger 100. The network 315 may include various networking elements (routers 310, hubs, switches, cellular towers 320, wired connections, wireless connections, etc.) for connecting to, for example, the Internet, a cellular data network, a local network, or a combination thereof as previously described. In some embodiments, the wireless charger 100 is configured to communicate directly with the remote server 325 through an additional wireless interface or with the same wireless interface that the wireless charger 100 uses to communicate with the battery pack 400.

Figure 4:
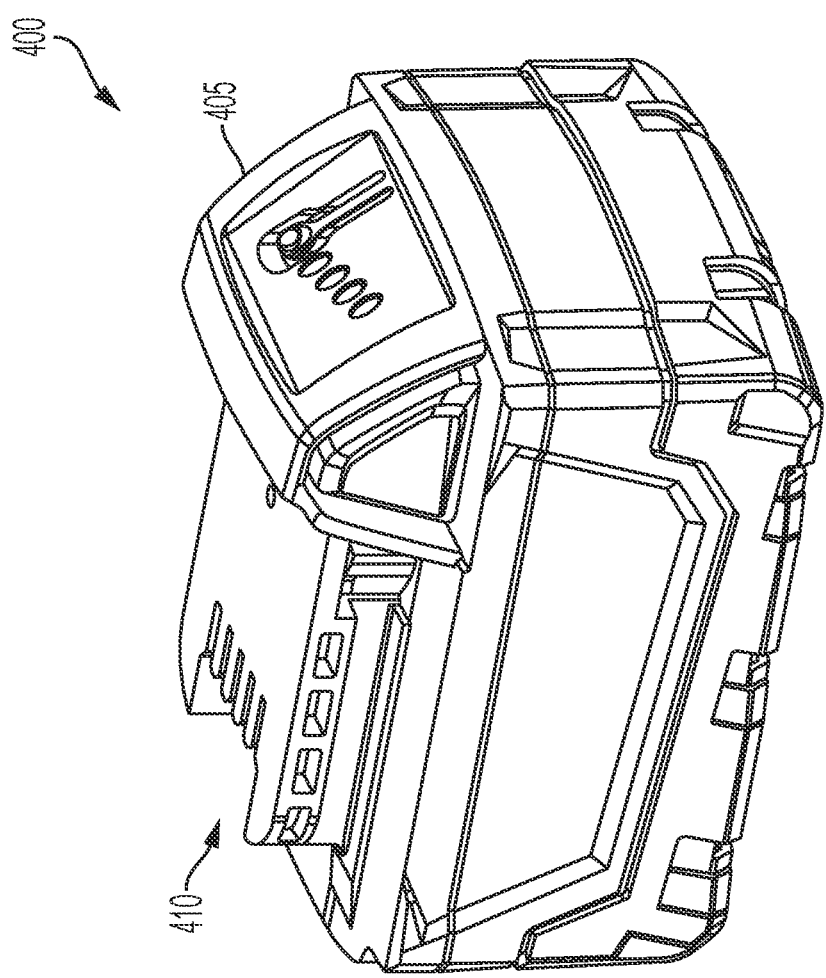
FIG. 4 illustrates a perspective view of a battery pack, in accordance with embodiments described herein.

FIG. 4 illustrates the battery pack 400 according to some embodiments. The battery pack 400 includes a battery pack housing 405 and a power tool interface 410. The power tool interface 410 is configured to couple the battery pack 400 to a power tool (not shown). The battery pack 400 provides the power tool with power using the power tool interface 410.

Figure 5:
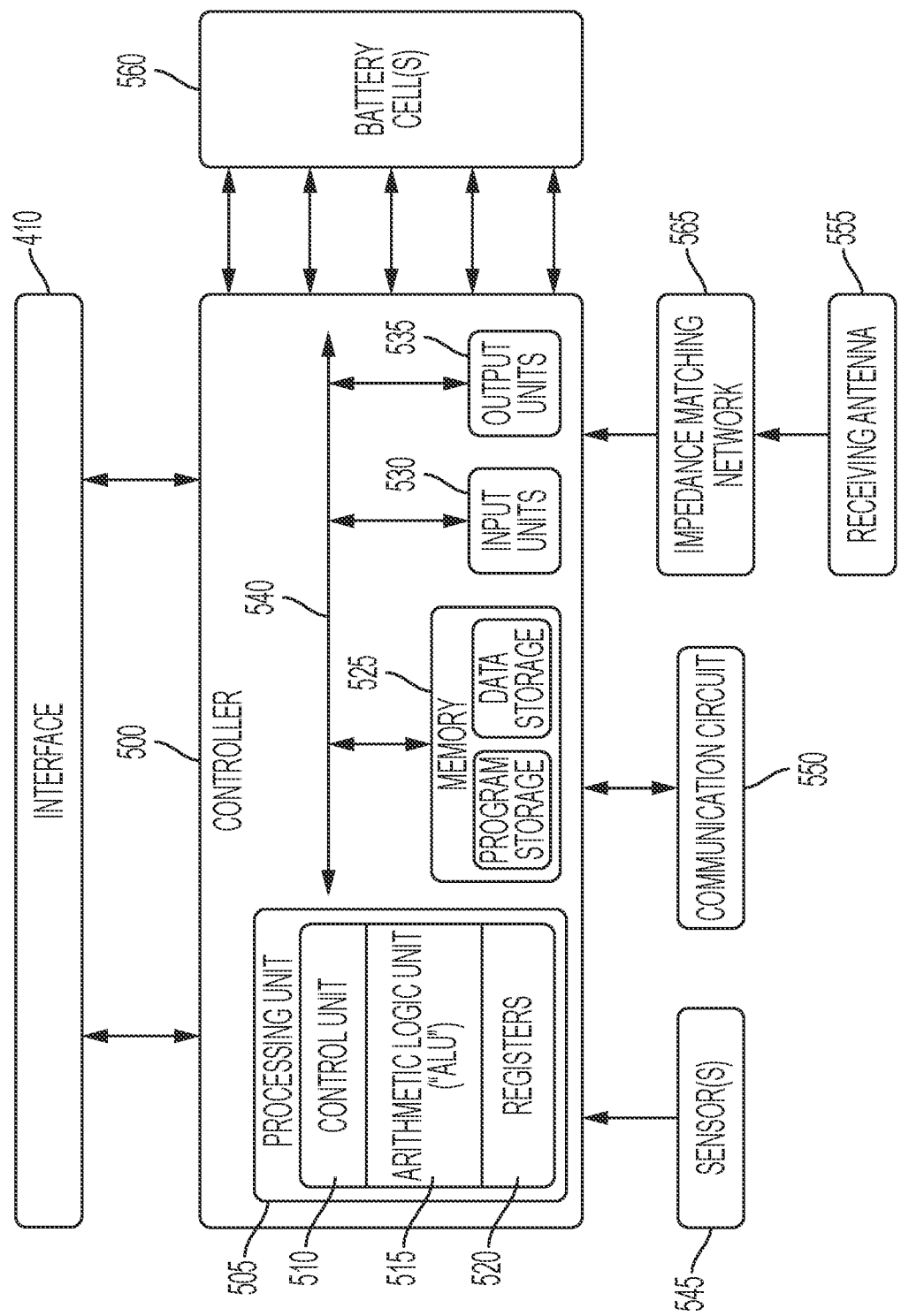
FIG. 5 illustrates a block diagram of a controller for the battery pack of FIG. 3, in accordance with embodiments described herein.

A battery pack controller 500 for the battery pack 400 is illustrated in FIG. 5. The battery pack controller 500 is electrically and/or communicatively connected to a variety of modules or components of the battery pack 400. For example, the illustrated battery pack controller 500 is connected to one or more battery pack sensors 545, a second communication circuit 550, a receiving antenna 555, one or more battery cell(s) 560, and the power tool interface 410.

The battery pack controller 500 includes a plurality of electrical and electronic components that provide power, operational control, and protection to the components and modules within the battery pack controller 500 and/or battery pack 400. For example, the battery pack controller 500 includes, among other things, a processing unit 505 (e.g., a microprocessor, an electronic processor, an electronic controller, a microcontroller, or another suitable programmable device), a memory 525, input units 530, and output units 535. The processing unit 505 includes, among other things, a control unit 510, an arithmetic logic unit ("ALU") 515, and a plurality of registers 520 (shown as a group of registers in FIG. 5), and is implemented using a known computer architecture (e.g., a modified Harvard architecture, a von Neumann architecture, etc.). The processing unit 505, the memory 525, the input units 530, and the output units 535, as well as the various modules connected to the battery pack controller 500 are connected by one or more control and/or data buses (e.g., common bus 540). The control and/or data buses are shown generally in FIG. 5 for illustrative purposes. The use of one or more control and/or data buses for the interconnection between and communication among the various modules and components would be known to a person skilled in the art in view of the embodiments described herein.

The memory 525 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 505 is connected to the memory 525 and executes software instruction that are capable of being stored in a RAM of the memory 525 (e.g., during execution), a ROM of the memory 525 (e.g., on a generally permanent basis), or another non-transitory computer readable medium such as another memory or a disc. Software included in the implementation of the battery pack 400 can be stored in the memory 525 of the battery pack controller 500. The software includes, for example, firmware, one or more applications, program data, filters, rules, one or more program modules, and other executable instructions. The battery pack controller 500 is configured to retrieve from the memory 525 and execute, among other things, instructions related to the control processes and methods described herein. In other embodiments, the battery pack controller 500 includes additional, fewer, or different components.

The one or more battery pack sensors 545 transmit signals associated with operational parameters of the battery pack 400 to the battery pack controller 500. The one or more battery pack sensors 545 may include, for example, a voltage sensor, a current sensor, and a temperature sensor. The voltage sensor may transmit voltage signals to the charger controller 200 indicative of a voltage of each of the battery cells 560 and a total stack voltage of the battery cells 560. The voltage signals may be used by the charger controller 200 to determine undervoltage conditions and overvoltage conditions. The current sensor may transmit current signals to the charger controller 200 indicative of a current provided by the battery cell(s) 560. The temperature sensor may transmit temperature signals to the charger controller 200 indicative of a temperature of the battery pack 400.

Figure 7:
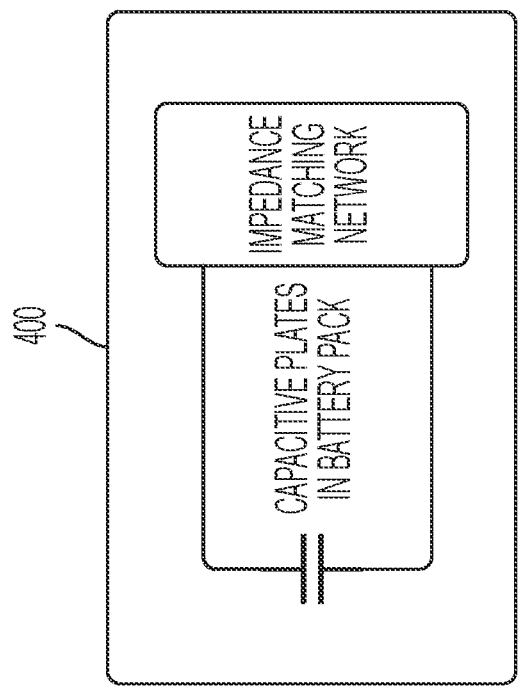
FIG. 7 illustrates an inductive coil and an impedance matching network of a battery pack, in accordance with embodiments described herein.
Figure 6:
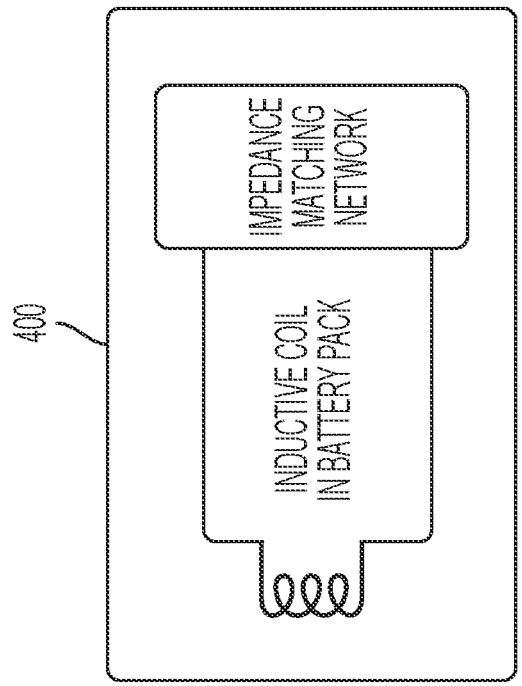
FIG. 6 illustrates capacitive plates and an impedance matching network of a battery pack, in accordance with embodiments described herein.

The receiving antenna 555 receives power from the transmitting antenna 260. Similar to the transmitting antenna 260, the receiving antenna 555 may be configured for one selected from a group consisting of capacitive power transfer and inductive power transfer. When configured for capacitive power transfer, the receiving antenna 555 is constructed from a pair of electrostatic plates acting as a capacitor. When configured for capacitive power transfer, the receiving antenna 555 receives the AC electric field generated by the transmitting antenna 260 and converts the AC electric field to DC power used to charge the one or more battery cells 560. When configured for inductive power transfer, the receiving antenna 555 is constructed as a conductor wrapped in a coil form (e.g., an inductive coil). When configured for inductive power transfer, the receiving antenna 555 receives the AC magnetic field generated by the transmitting antenna 260 and converts the AC magnetic field to DC power used to charge the one or more battery cell(s). In both embodiments, an impedance matching network 565 forms a complex impedance that may be characterized over a range of frequencies (see FIGS. 6 and 7). The complex impedance may be represented in a vector form having both magnitude and angular displacement components. By varying the geometries of the antenna structure or the components used within the impedance matching network 565, the characteristics of the complex impedance can be well defined. By then associating the characteristics of the complex impedance with a specific battery pack, the battery pack under charge can be identified by the wireless charger 100 prior to charging. The battery pack identification allows for the determination of ideal or customized charging parameters for the battery pack (e.g., to maximize wireless power transfer).

The battery pack controller 500 communicates with the charger controller 200 using the second communication circuit 550. For example, the battery pack controller 500 may transmit charging parameters of the battery pack 400 to the charger controller 200. The charging parameters of the battery pack 400 may be dependent on a battery pack type of the battery pack 400. In some embodiments, the second communication circuit 550 includes an RFID tag storing the charging parameters of the battery pack 400. The first communication circuit 255 of the charger controller 200 reads the RFID tag to obtain the charging parameters of the battery pack 400. In some embodiments, the first communication circuit 255 and the second communication circuit 550 are configured to communicate over Bluetooth. In some embodiments, the wireless charger 100 and the battery pack 400 communicate through the transmitting antenna 260 (or antennas 262, 264, 266, 268) and receiving antenna 555 whether capacitive or inductive power transfer is being employed.

In some embodiments, the charger controller 200 detects the complex impedance of the battery pack 400 to determine the battery pack type of the battery pack 400. For example, the charger controller 200 may detect one or more physical parameters of the electrostatic plates used to form the receiving antenna 555, such as the size or composition of the electrostatic plates (e.g., which affects the complex impedance vector). The charger controller 200 determines the battery pack type of the battery pack 400 based on the detected electrostatic plates. In some embodiments, the charger controller 200 detects the size or material of the inductive coil used to form the receiving antenna 555 (e.g., which affects the complex impedance vector). The charger controller 200 determines the battery pack type of the battery pack 400 based on the detected inductive coil. In some embodiments, the charger controller 200 compares the determined battery pack type to a look-up table stored in the memory 225 to determine the charging parameters of the battery pack 400.

As described above, the wireless charger 100 and the battery pack 400 can communicate control information using the first communication circuit 255 and the second communication circuit 550 respectively (e.g., a control transmission path, a first transmission path, etc.). The transmitting antenna 260 of the wireless charger 100 transmits power to the receiving antenna 555 of the battery pack 400 (e.g., a power transmission path, a second transmission path, etc.). In some embodiments, the wireless charger 100 and the battery pack 400 embed control information in the power transmission signal provided via the power transmission path. For example, the charger controller 200 and the battery pack controller 500 embed control information using load modulation.

Figure 9:
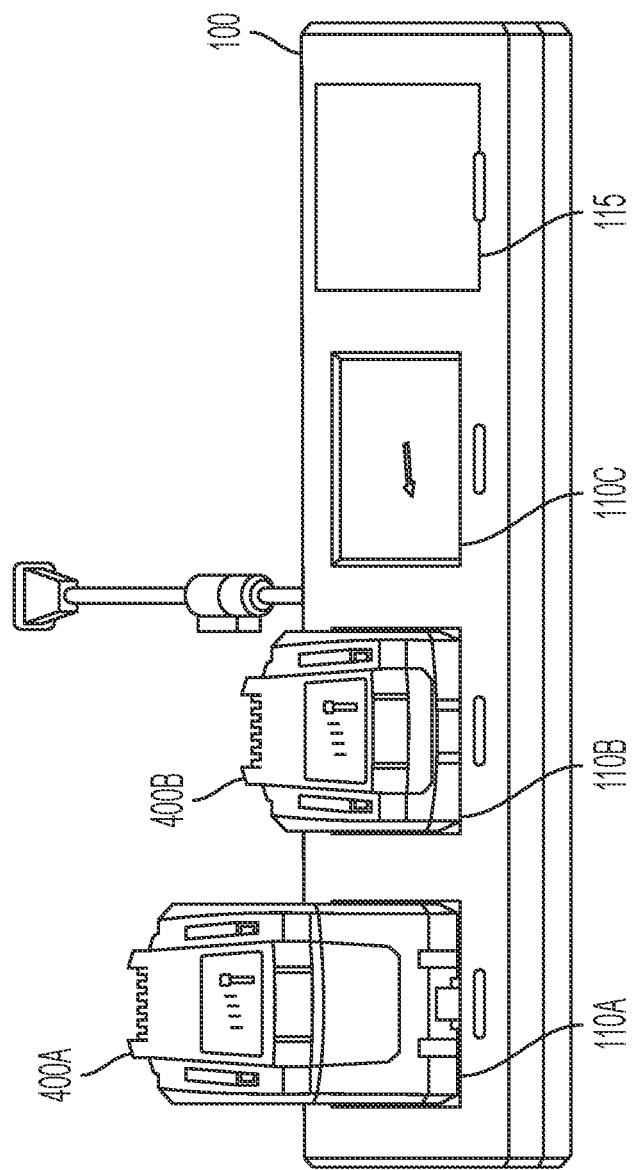
FIG. 9 illustrates a perspective view of a plurality of battery packs of FIG. 3 associated with the wireless charger of FIG. 1, in accordance with embodiments described herein.

FIG. 8 and FIG. 9 illustrate a first battery pack 400a and a second battery pack 400b associated with the wireless charger 100. The first battery pack 400a may be of a first battery pack type and is placed within the first charging station 110a. The second battery pack 400b may be of a second battery pack type and is placed within the second charging station 110b. Although not illustrated, in some embodiments, a third battery pack 400 may be placed within the third charging station 110c. Each charging station 110a-110c is contoured such that the corresponding battery pack 400 is more securely situated on the charging station 110a-110c. A mobile device, such as external device 305, may be wirelessly charged using the secondary charging station 115.

The wireless charger 100 may charge each battery pack 400 depending on its battery pack type. For example, FIG. 10 provides a method 800 performed by the charger controller 200 for charging a battery pack 400. The battery pack 400 may be, for example, the first battery pack 400a of FIGS. 8-9. At block 805, the charger controller 200 receives the first battery pack 400a. For example, the first battery pack 400a is placed within the first charging station 110a. At block 810, the charger controller 200 determines a battery pack type for the first battery pack 400a. In some embodiments, as described above, the charger controller 200 determines a battery pack type based on the complex impedance vector for the battery pack 400a, a signal received from the second communication circuit 550, or an RFID tag of the first battery pack 400a.

At block 815, the charger controller 200 adjusts or modifies a charging parameter for the battery pack 400a (e.g., charging power) based on the determined battery pack type. For example, the charger controller 200 may control the switching network 278 to set an impedance that matches the determined battery pack type. If the battery pack type for the first battery pack 400a is a first battery pack type, the controller 200 may control the switching network 278 to connect the transmitting antenna 260 to a first resistor, a first inductor, and a first capacitor of the impedance matching network 275. If the battery pack type for the first battery pack 400a is a second battery pack type, the controller 200 may control the switching network 278 to connect the transmitting antenna 260 to a second resistor, a second inductor, and a second capacitor of the impedance matching network 275. At block 820, the charger controller 200 provides power to the transmitting antenna 260, as previously described. Thus, the transmitting antenna 260 generates power received by the receiving antenna 555 based at least partially on the determined battery pack type.

Additionally, the wireless charger 100 is configured to simultaneously and independently charge multiple battery packs 400 of differing types. For example, as illustrated in FIG. 9, both a first battery pack 400a and a second battery pack 400b may be placed on the wireless charger 100. The first battery pack 400a and the second battery pack 400b may have different battery pack types, such as a first battery pack type (e.g., first battery pack amp-hour capacity) and a second battery pack type (e.g., a second battery pack amp-hour capacity), respectively. The charger controller 200 executes the method 800 for both the first battery pack 400a and the second battery pack 400b. Accordingly, the first battery pack 400a and the second battery pack 400b can receive, for example, different charging powers due to having different battery pack capacities. In some embodiments, a third battery pack 400 has a third battery pack type (e.g., a third battery pack amp-hour capacity). In some embodiments, the secondary charging station 115 transmits a constant amount of power regardless of the external device 305.

Thus, embodiments provided herein describe, among other things, systems and methods for wireless charging of a plurality of power tool battery packs. Various features and advantages are set forth in the following claims.

What is claimed is:
1. A charging system comprising:
 a plurality of battery packs, each of the plurality of battery packs including a receiving antenna configured to convert an alternating current power to a charging current; and a wireless charger including:
- an alternating current to direct current converter configured to provide direct current power,
- a transmitter antenna configured to convert direct current power received from the alternating current to direct current converter to the alternating current power and transmit the alternating current power to at least one of the plurality of battery packs,
- an impedance matching network coupled to the controller and the transmitter antenna, the impedance matching network configured to set an impedance of the transmitter antenna;
- a communication circuit configured to transmit communication signals to and receive communication signals from a mobile device and each of the plurality of battery packs, and
- a controller including an electronic processor and a memory, the controller configured to:
  - determine a battery pack type of each of the plurality of battery packs based on communication signals received from each of the plurality of battery packs,
  - determine an impedance of each of the plurality of battery packs based on the respective battery pack types, and
  - control the impedance matching network to match the impedance of at least one of the plurality of battery packs.

2. The charging system of claim 1, wherein the wireless charger is a charging pad.

3. The charging system of claim 2, wherein the charging pad is integrated within a toolbox.

4. The charging system of claim 1, wherein the wireless charger includes one or more contours, each of the one or more contours configured to receive one of the plurality of battery packs.

5. The charging system of claim 4, wherein the wireless charger includes three contours.

6. The charging system of claim 1, wherein the wireless charger further includes:
- a first transmission path for transmitting the alternating current power to one of the plurality of battery packs, and
- a second transmission path for transmitting control information to the one of the plurality of battery packs.

7. The charging system of claim 1, wherein the wireless charger, using the communication circuit, transmits at least one selected from a group consisting of an input power, an output power, a battery pack capacity, and a charge time to the mobile device.

8. The charging system of claim 1, wherein the wireless charger further includes a charging station configured to charge a Qi-compatible device.

9. The charging system of claim 1, wherein the wireless charger further includes one or more USB inputs.

10. The charging system of claim 1, wherein:
the impedance matching network includes a switching network.

11. A charging system comprising:
a battery pack including a receiving antenna configured to convert an alternating current field to a charging current, the receiving antenna having a complex impedance; and
a wireless charger including:
- an alternating current to direct current converter configured to provide direct current power,
- a transmitter antenna configured to convert direct current power received from the alternating current to direct current converter to an alternating current power and generate the alternating current field,
- an impedance matching network coupled to the transmitter antenna, the impedance matching network configured to set a complex impedance of the transmitter antenna,
- a communication circuit configured to transmit communication signals to and receive communication signals from the battery pack, and
- a charger controller configured to:
  - determine a battery pack type of the battery pack based on a communication signal received from the battery pack,
  - determine the complex impedance of the receiving antenna based on the battery pack type,
  - control the impedance matching network to match the complex impedance of the receiving antenna, and
  - provide the alternating current power to the transmitting antenna to charge the battery pack.

12. The charging system of claim 11, wherein the receiving antenna includes a pair of electrostatic plates.

13. The charging system of claim 12, wherein the charger controller is configured to:
detect at least one selected from the group consisting of a size and a composition of the pair of electrostatic plates; and
determine the charging parameter based on the at least one selected from the group consisting of the size and the composition of the pair of electrostatic plates.

14. The charging system of claim 11, wherein the receiving antenna includes an inductive coil.

15. The charging system of claim 14, wherein the charger controller is configured to:
detect at least one selected from the group consisting of a size and a material of the inductive coil; and
determine the charging parameter based on the at least one selected from the group consisting of the size and the material of the inductive coil.

16. A method of wirelessly charging a battery pack for a power tool, the method comprising:
receiving, at a wireless charger, the battery pack;
determining, with a controller, a battery pack type for the battery pack based on a communication signal received from the battery pack;
determining, with the controller, an impedance of the battery pack based on the battery pack type,
controlling, with the controller, an impedance matching network to adjust an impedance of a transmitting antenna to match the impedance of the battery pack; and
providing, with the controller, power to the transmitting antenna of the wireless charger to charge the battery pack based on the charging parameter.

17. The method of claim 16, wherein controlling the impedance matching network includes:
connecting one or more of a resistor, an inductor, and a capacitor to the transmitting antenna of the wireless charger.

18. The method of claim 16, wherein the impedance is based on one or more physical parameters of a receiving antenna of the battery pack.

* * * * *